April 12, 1955
S. S. MINER
2,706,108
APPARATUS FOR CONTINUOUSLY BLENDING
LATEX AND A PREFORMED FROTH
Filed Feb. 5, 1952
2 Sheets-Sheet 1
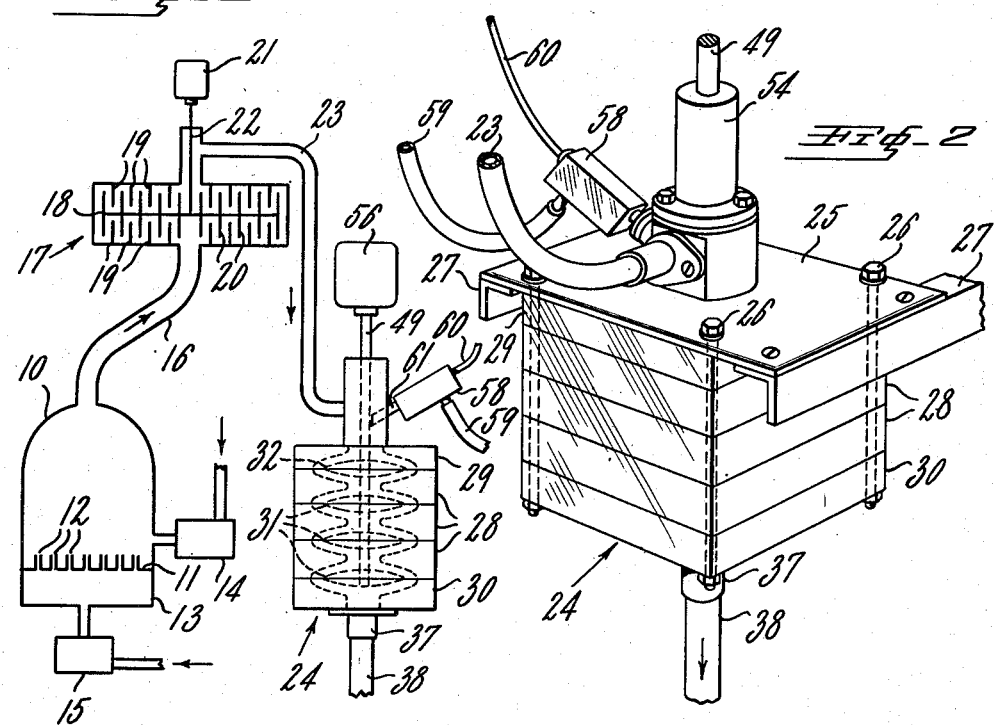
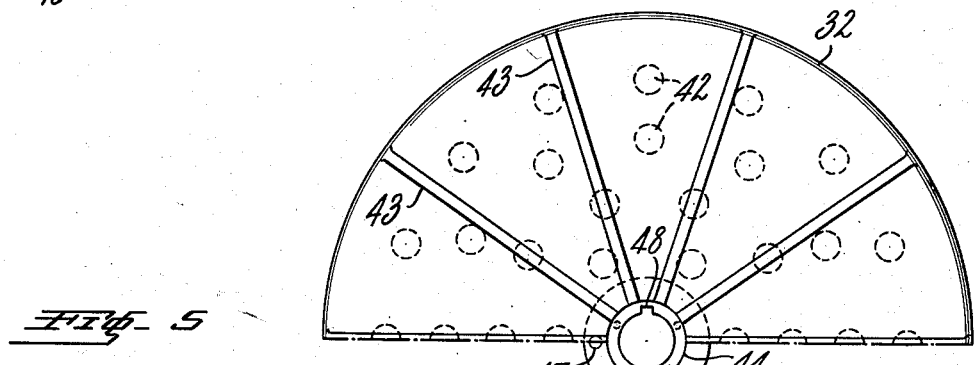
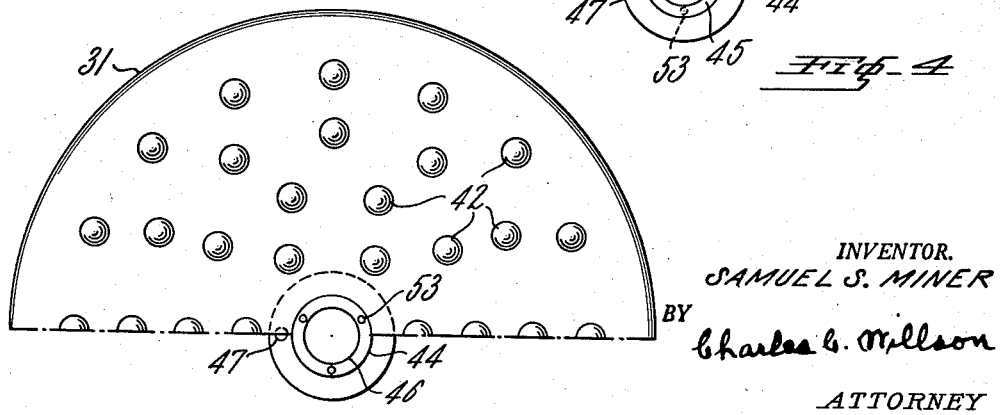
INVENTOR.
SAMUEL S. MINER
BY
Charles G. Willson
ATTORNEY

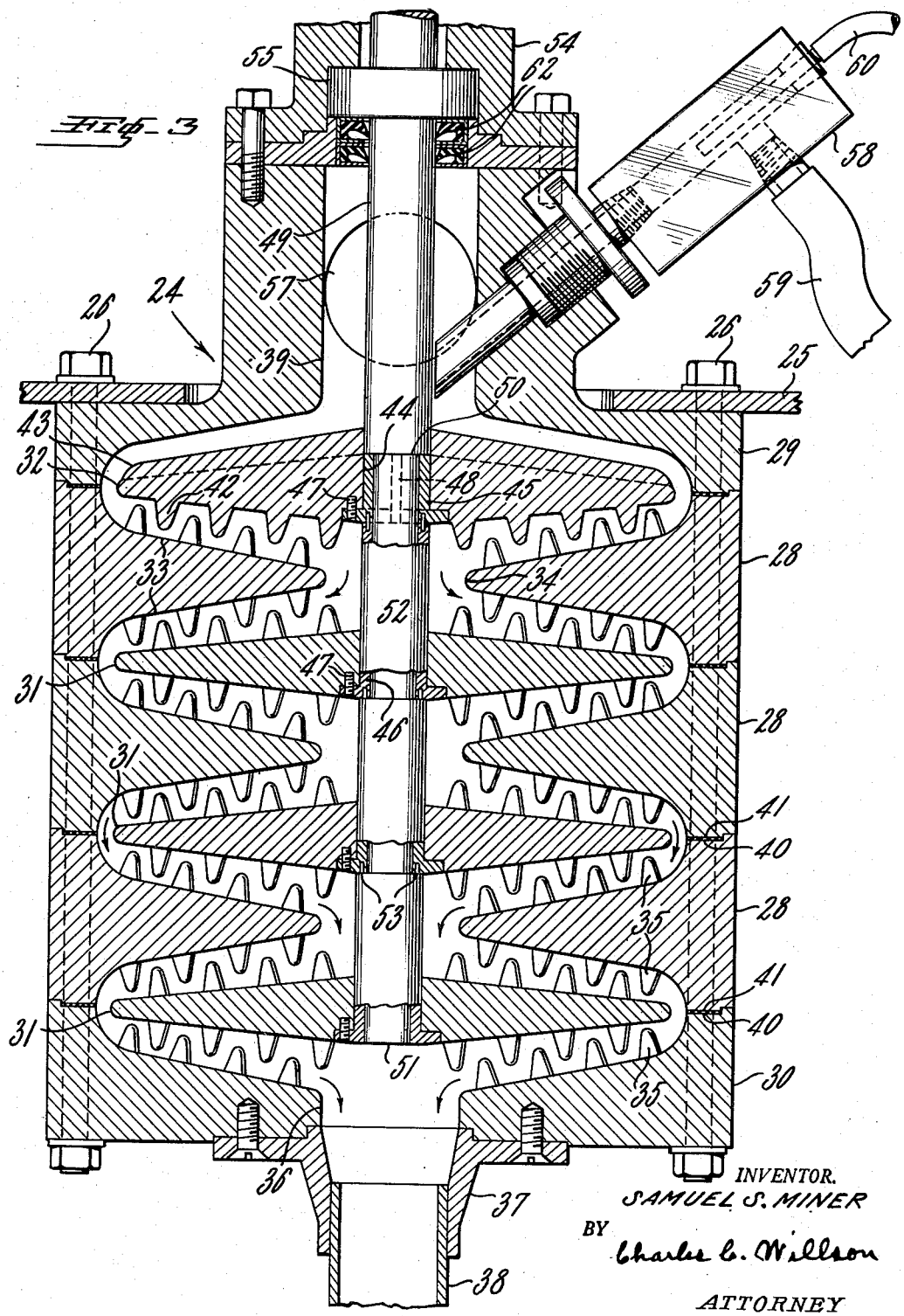

United States Patent Office 2,706,108
Patented Apr. 12, 1955

2,706,108

APPARATUS FOR CONTINUOUSLY BLENDING LATEX AND A PREFORMED FROTH

Samuel S. Miner, Mishawaka, Ind., assignor to United States Rubber Company, New York, N. Y., a corporation of New Jersey Application February 5, 1952, Serial No. 270,037

2 Claims. (Cl. 259—8)

This invention relates to apparatus for continuously blending latex foam, and particularly to an apparatus for blending latex foam from a preformed froth and latex.

Heretofore it has been common to manufacture foam rubber articles by whipping a compound of natural or synthetic latex and various ingredients such as stabilizers, gelling agents, vulcanizing agents, accelerators and antioxidants into a foam, pouring this foam into a mold, allowing the foam to set, and vulcanizing the foam. When foam rubber articles are made by such prior method, they have non-uniform air cells, and the rubber coagulates unevenly to produce a foam which is weak and which utilizes rubber uneconomically.

In the co-pending application of Keen, Serial No. 166,871, filed June 8, 1950, now Patent No. 2,673,723, granted March 30, 1954, there is disclosed a method and apparatus for making foam rubber articles by which a highly uniform and superior article can be manufactured. In this Keen apparatus a froth is formed of any suitable material and the froth is sheared to a uniform bubble size, after which latex is blended with the froth, and the foam is conducted to a mold. The entire system is closed and pressurized so that the froth and foam flow through the apparatus under pressure.

Although this Keen process of making latex foam produces a superior product, it presents additional problems, and in particular it presents the problem of clogging the closed apparatus. Since the latex must necessarily be sensitized before the final foam is mixed, and since sensitized latex will gel upon the application of sufficient heat or the passage of sufficient time, the latex on occassion will gel in the mixing apparatus and clog it. When this occurs production must be stopped while the apparatus is cleaned; hence production is lost, and manpower is wasted.

It is the primary object of the present invention to make an improved closed blender in which the tendency of the foam rubber to gel in the blender is materially reduced. It is a further object of this invention to make such a blender having a high capacity output of good quality rubber foam.

These objects are achieved primarily by providing an unobstructed tortuous flow path through the apparatus for the materials to be mixed, and by providing means in this flow path which mix the latex foam with a folding action rather than a turbulent shearing action. The blender is constructed to provide a flow path which has a uniform area throughout its length, so that it is free of dead areas in which the foam might accumulate and gel. Inasmuch as the flow path is also free of obstructions, the latex passes continuously through the apparatus and cannot accumulate at any point to gel readily.

For a better understanding of these and other objects and characteristics of this invention, reference should be had to the following description and the accompanying drawings, wherein:

Fig. 1 is a schemaatic view of a complete apparatus for making foam rubber having the blender of this invention as an element thereof;

Fig. 2 is a perspective view of the blender of this invention showing the inlet and outlet conduits for the blend ingredients;

Fig. 3 is a vertical sectional view of the blender through the latex inlet;

Fig. 4 is a plan view of one-half of the top distributor rotor of this invention, and Fig. 5 is a plan view of one-half of one of the mixing rotors of this invention.

Referring now to the drawings and to Fig. 1 in particular, there is shown an apparatus for manufacturing foam rubber continuously which utilizes the blender of this invention. This apparatus, which has the same essential elements as the apparatus disclosed in the above-mentioned Keen application, consists of a frothing chamber 10 having a floor 11 pierced by a plurality of needles 12 which open into a gas chamber 13. A frothing agent, such as a suitable soap solution, is supplied from a source (not shown) to a pump 14 which supplies the frothing agent to the chamber 10 in sufficient quantities to maintain the needles 12 covered; a suitable gas, such as air, is supplied to a pump 15 and thence to the chamber 13 under pressure from whence it escapes through the needles 12 to pass upwardly through the soap solution and form a froth in the chamber 10. The proportions of latex, gelling agent, soap and gas are all controlled in the process, and for this purpose the elements 14 and 15 may be metering pumps.

From the frothing chamber 10, the froth is led by means of a conduit 16 to a shearer 17 having a perforated rotor 18 and stators 19 enclosed in the casing shown. The rotor 18 has a plurality of perforated concentric cylindrical elements 20 projecting from the upper and lower surface thereof adapted to rotate between the stators 19. A driving means 21 rotates a shaft 22 which carries and rotates the rotor 18 to shear the soap bubbles to a uniform size as they are forced through the shearer. From the shearer 17 the pre-formed froth is led to the blender of this invention by means of a conduit 23.

The frothing chamber 10 and shearer 17 are essentially the same elements as the frother and shearer described in the above-mentioned Keen application. Inasmuch as these elements and their manner of cooperation are fully described there, and since they form no part of the present invention, they will not be described further here.

Referring now to Figs. 2 and 3 there is shown the blender of this invention designated generally by 24, supported by a plate 25 bolted to the blender by means of the bolts 26 which serve also to keep the stators of the blender together. The plate 25 is supported by angle irons 27.

The blender of this invention comprises a series of intermediate stators 28, an upper stator 29, a lower stator 30, a plurality of mixing rotors 31 and an upper distributor rotor 32. The intermediate stators 28 consist of blocks of material having circular bowl-like portions 33 hollowed out of the top and bottom thereof, and a central circular opening 34 connecting the top and bottom bowls. Extending from the surfaces of the bowls 33 are a series of smooth surfaced rounded knobs or projections 35 which are evenly spaced in concentric circles about the bowls. The lower stator 30 is similar to the intermediate stators, except that it has a bowl hollowed out of its upper surface only, and has an opening 36 leading therefrom to a fixture 37 and pipe 38 to form an unobstructed outlet conduit for the latex foam. The upper stator 29 has a bowl hollowed out of its lower surface only, and there are no pins projecting from the surface of this bowl. A neck 39 extends upwardly from the upper stator 29 and has two openings therein to receive the froth and the latex. The intermediate and lower stators have the interlocking portions 40 provided with the gaskets 41 which form a fluid tight seal between adjacent stators. Although the bowls of the stators are circular, the stators are square to permit the bolts 26 to be passed therethrough without obstructing the mixing chambers.

The lower bowl of one stator and the upper bowl of an adjacent stator cooperate to form a mixing chamber having a vertical cross section which is substantially elliptical. The first or upper mixing chamber has the knobs or pins 35 extending from the lower surface only thereof, and the succeeding mixing chambers have pins extending from both their upper and lower surfaces. Disposed within the upper mixing chamber is a disc-like rotor 32 and in the other mixing chambers the rotors 31. The distributor rotor 32 in the uppermost mixing chamber has a series of pins 42 extending from its lower surface, and the mixing rotors 31 in the succeeding chambers have the pins 42 extending from both their upper and lower surfaces. These pins like the similar pins 35 on the stators are smooth surfaced rounded projections and are disposed symmetrically in concentric circles about the center of the disc-like rotor. The rotor 32 carries the radial fins 43 on its upper surface to distribute the latex evenly into the froth as these materials first enter the blender.

Each rotor is suspended in its mixing chamber to rotate substantially in a plane through the major axis thereof, so that the pins 42 project between the pins 35 on the stators and nearly to the chamber walls. Similarly the pins 35 project nearly to the surfaces of the stators; hence the froth and latex in passing through the tortuous flow path of the blender impinge on first one set of pins and then another. When the rotors rotate, the pins 42, which rotate between the pins 35 on the adjacent concentric circles, tend to drag the mixture around with the rotors, but the pins 35 on the chamber walls tend to retard the rotation of such mixture. Since the mixture is fluid and since the pins 35 and 42 have smooth rounded surfaces, the froth and latex are interfolded gently, but thoroughly with little or no turbulence into a highly uniform latex foam.

The rotors 31, 32 are rotatably suspended in the mixing chambers from a shaft 49 by means of bushings 45 and 46. Each rotor has a central opening therethrough to receive a bushing, and it is fixed thereto by means of a screw 47. The upper bushing 45 has a key-way 48 which receives a key on the shaft 49 to lock the rotor to the shaft, and the shaft has a shoulder 50 to position the bushing 45 thereon. The shaft is reduced in diameter for a substantial portion of its length as indicated by 51 to extend through the bushings 45 and 46 to align the rotors 31, 32 in the blender, and the lower bushings 46 have necks 52 to space each rotor vertically on the shaft. The mixer rotors 31 are driven from the upper bushing 45 through the bushings 46 which have three pins 53 on the necks 52 that press-fit into cooperating holes in adjacent bushings to suspend the rotors on the shaft 51.

The shaft 49, 51 is suspended in cantilever fashion from a sleeve 54 which has a lower bearing 55, oil seals 62 and an upper bearing (not shown), and this shaft is driven from a variable speed device 56. The oil seals 62 serve not only to seal the oil in the bearing 55 but also to seal the froth and latex in the blender. Inasmuch as the rotors 31, 32 are supported in the mixing chambers in cantilever fashion, there is no need for a support for these rotors below the latex inlet, and in particular, there is no need for a support for the lower end of the shaft 51, which would necessarily project across the flow path; hence this path, below the latex inlet, is free of obstructions about which the sensitized latex could accumulate and gel.

To reduce further the tendency of the latex to gel in the blender, the rotors and stators are proportioned so that the area of the flow path is substantially constant throughout the blender, i. e. the total area at each annular section normal to the direction of flow is constant. Thus, the distance between the surfaces of the rotors and chamber walls decreases from the shaft to the periphery of the rotors where this distance is a minimum. In this manner the flow rate of the latex and froth is maintained constant throughout the blender, and there are no areas in the flow path where latex may accumulate.

In blending latex foam in the blender of this invention, the froth is led under pressure from the shearer 17 through the conduit 23 to the discharge opening 57 in the neck 39 of the blender. The compounded latex is led through the conduit 59 to the latex head 58 where it is mixed with the gelling agent supplied from a conduit 60. The mixed latex and gelling agent flow down the inclined pipe 61 which terminates immediately adjacent the shaft 49, and is deposited on and around the shaft. The latex then flows down the shaft 49 to the distributing rotor 32 to be distributed evenly in the froth by the fins 43. The latex and froth then flow about the rotors 32, 31 through the mixing chambers where they are thoroughly blended by the gentle folding action of the pins 35, 42 and thence through the discharge conduit 38 to a mold (not shown).

The blender of this invention is essentially a low speed high capacity machine, but the precise speed at which it is run depends upon the conditions of the blend; the froth and latex must be thoroughly mixed. Since the speed at which the mixture travels through the blender may be varied greatly by varying the pressure on the froth, the speeds of the rotors 31, 32 at which the latex foam will be thoroughly mixed may be varied widely. In operation a blender constructed according to this invention is found to run most efficiently at speeds from 110 to 300 R. P. M., but it is capable of producing good foam rubber at speeds from 50 to 500 R. P. M. Although from the foregoing it will be apparent that the speed of the blender may be varied greatly to meet varying conditions, the rotors 31, 32 must not be rotated too rapidly, for excessive rotor speeds not only tend to break up the uniform bubbles of the froth and to shear the latex, but also the friction at higher speeds generates heat which will tend to set the latex.

Although only four mixing chambers have been shown in the blender illustrated in the drawings, the number of mixing chambers may be increased or decreased for any given installation, so long as the length of the shaft which supports the rotors is not increased to the extent that a bearing is required therefor below the latex inlet. Similarly the dimensions of the rotors and stators may be varied. In operation, a single blender having a maximum rotor diameter of 6½ inches is capable of mixing sufficient foam to pour continuously sheets from ⅛" thick and 36" wide up to sheets 1¾" thick and 72" wide.

A machine built in accordance with this invention is capable of blending latex foam continuously without clogging for much greater periods of time than the machines heretofore used. Thus in production tests, one blender constructed according to this invention ran from 2½ to over 5 times as long without the latex coagulating in the blender as the machine heretofore used. Further, when the latex does coagulate in the blender of this invention it will be apparent that the blender may be disassembled readily for cleaning. One need only remove the nuts from the bolts 26 and pull the several rotors from the shaft 51. Similarly, the blender may be reassembled easily, and thus "down time" is greatly reduced.

Although the specific materials of which the rotors and stators are formed are not critical, these elements must be resistant to the corrosive gelling agents used in the latex. Further, the stators and rotors may be made by any suitable process, but because of the large number of pins projecting from the surfaces thereof they are preferably cast rather than machined. Rotors and stators formed of cast aluminum, and bushings formed of stainless steel, have been used to construct a highly satisfactory blender.

Having thus described my invention, what I claim and desire to protect by Letters Patent is:

1. A foam blender of the type described, comprising a plurality of mixing chambers, a rotor disposed in each of said chambers to provide a tortuous flow path through the chambers about the rotors, the distance between the surfaces of said rotors and the walls of said chambers being progressively less from the centers of rotation of said rotors to the peripheries thereof to provide a flow path having a substantially constant cross-sectional area throughout the blender, a plurality of smooth rounded pins projecting from the surfaces of said rotors and from the walls of said chambers into the flow path to interfold the ingredients which form the blend gently when the rotors are rotated, each of said chambers having an inlet and outlet therein, the inlets of said chambers being substantially aligned, the outlets of the chambers preceding the final chamber being substantially aligned and aligned with said inlets, a shaft suspended in cantilever fashion projecting into all of said chambers through said aligned inlets and outlets to rotatably support said rotors, and an unobstructed discharge conduit aligned with said shaft and leading from the last of said chambers.

2. A foam blender of the type described, comprising a plurality of mixing chambers, a rotor disposed in each of said chambers to provide a tortuous flow path through the chambers about the rotors, the distance between the surfaces of said rotors and the walls of said chambers being progressively less from the centers of rotation of said rotors to the periphery thereof to provide a flow path having a substantially constant cross-sectional area throughout the blender, a plurality of smooth pins extending from the surface of said rotors into said flow path, further smooth pins extending from the surfaces of said chambers into said flow path and cooperating with the pins on said rotors to mix the froth and latex, said pins being substantially free of sharp edges, each of said chambers having an inlet and outlet therein, the inlets of said chambers following the first being substantially aligned, the outlets of said chambers preceding the final chamber being substantially aligned and aligned with said aligned inlets, a shaft suspended in cantilever fashion projecting into all of said chambers through said aligned inlets and outlets to rotatably support said rotors, a discharge conduit leading from the last of said chambers, and means for driving said shaft.

References Cited in the file of this patent

UNITED STATES PATENTS

| | | |
|---|---|---|
| 1,019,953 | Fay | Mar. 12, 1912 |
| 1,444,255 | Lidholm | Feb. 6, 1923 |
| 1,624,567 | Teague | Apr. 12, 1927 |
| 1,658,938 | Owens | Feb. 14, 1928 |
| 1,670,593 | Miller | May 22, 1928 |
| 1,711,154 | Michal | Apr. 30, 1929 |
| 1,727,753 | De Bethune | Sept. 10, 1929 |
| 1,952,638 | Taylor | Mar. 27, 1934 |
| 2,206,633 | Ditto | July 2, 1940 |